United States Patent
Morimoto et al.

(10) Patent No.: US 7,619,755 B2
(45) Date of Patent: Nov. 17, 2009

(54) APPARATUS, METHOD, SYSTEM, AND COMPUTER PROGRAM FOR MANAGING IMAGE PROCESSING

(75) Inventors: Katsushi Morimoto, Tokyo (JP); Hirobumi Nishida, Kanagawa-ken (JP); Keiji Kojima, Kanagawa-ken (JP); Toshihiro Suzuki, Tokyo (JP); Takashi Saitoh, Kanagawa-ken (JP); Toshio Miyazawa, Kawasaki (JP)

(73) Assignee: Ricoh Company, Ltd., Kanagawa (JP)

( * ) Notice: Subject to any disclaimer, the term of this patent is extended or adjusted under 35 U.S.C. 154(b) by 822 days.

(21) Appl. No.: 11/210,839

(22) Filed: Aug. 25, 2005

(65) Prior Publication Data
US 2006/0044623 A1 Mar. 2, 2006

(30) Foreign Application Priority Data
Sep. 1, 2004 (JP) ............................. 2004-254046

(51) Int. Cl.
*G03F 3/08* (2006.01)
*H04N 1/46* (2006.01)
(52) U.S. Cl. .................. 358/1.1; 358/518; 358/537; 358/540
(58) Field of Classification Search ............. 358/1.1, 358/1.14, 1.15, 500, 518, 525; 345/150, 345/838, 594
See application file for complete search history.

(56) References Cited

U.S. PATENT DOCUMENTS 5,844,542 A * 12/1998 Inoue et al. ............... 345/594
6,750,890 B1 * 6/2004 Sugimoto ................... 715/838
7,016,064 B2    3/2006 Iida et al.

FOREIGN PATENT DOCUMENTS

| JP | 6-83916 | 3/1994 |
|---|---|---|
| JP | 9-27916 | 1/1997 |
| JP | 09-297684 | 11/1997 |
| JP | H09-297684 | 11/1997 |
| JP | 10-269045 | 10/1998 |
| JP | 11-119956 | 4/1999 |
| JP | H11-119956 | 4/1999 |
| JP | 11-289413 | 10/1999 |
| JP | 2000-6475 | 1/2000 |
| JP | 2001-143055 A | 5/2001 |
| JP | 2001-183759 | 7/2001 |
| JP | 2001-209818 A | 8/2001 |
| JP | 2003-256177 | 9/2003 |
| WO | WO 92/20184 | * 11/1992 |

OTHER PUBLICATIONS

VanHam et al.; "Visualization of State Transition Graphs"; IEEE Symposium on Information Visualization; Eindhoven University of Technology, Department of Mathematics and Computer Science; Jun. 8, 2002; pp. 59-66.
Sue Chastain; "Discovering Photoshop 5.5"; http://graphicssoft.about.com/library/weekly/aa090699x1.htm; Jun. 9, 1999; pp. 1-2.
European Search Report dated Jun. 3, 2008.
Japanese Office Action, dated Aug. 4, 2009.

* cited by examiner

*Primary Examiner*—Mark K Zimmerman
*Assistant Examiner*—Haris Sabah
(74) *Attorney, Agent, or Firm*—Dickstein Shapiro LLP (57) ABSTRACT

An apparatus, method, system, computer program and product, each capable of inputting an input image; obtaining an image object indicating image processing to be applied to the input image; and managing a state of the image object and transition of the state.

17 Claims, 10 Drawing Sheets

| ATTRIBUTE | |
|---|---|
| TONE_CORRECTION_MODE | MODE OF TONE CORRECTION |
| TONE_CORRECTION_FACTOR | INDEX OF TONE CORRECTION |
| MAGNIFICATION_FACTOR | MAGNIFICATION FACTOR OF CHARACTER |

FIG. 8

| ATTRIBUTE/STATE | 0 | 1 | 2 | 3 |
|---|---|---|---|---|
| TONE_CORRECTION_MODE | −1 | 1 | 1 | −1 |
| TONE_CORRECTION_FACTOR | 0 | 1 | 1 | 0 |
| MAGNIFICATION_FACTOR | 0 | 0 | 2 | 2 |

FIG. 9

| METHOD | |
|---|---|
| GET_STATUS | GET PARAMETERS |
| SET_TONE_CORRECTION | SET PARAMETERS OF TONE_CORRECTION_MODE AND TONE_CORRECTION_FACTOR |
| SET_TEXT_ENHANCEMENT | SET PARAMETERS OF TONE_CORRECTION_FACTOR |
| GET_BINARY_CHARACTER | GENERATE BINARY CHARACTER IMAGE |
| RENDERING | GENERATE RASTER IMAGE |

APPARATUS, METHOD, SYSTEM, AND COMPUTER PROGRAM FOR MANAGING IMAGE PROCESSING

CROSS-REFERENCE TO RELATED APPLICATIONS

1. Field of the Invention

The following disclosure relates generally to an apparatus, method, system, and computer program and product for managing image processing.

2. Description of the Related Art

The existing image processing apparatus stores information regarding a plurality of image processing operations applied to an input image as a processing history. Using this processing history, the existing image processing apparatus may repeat one of the image processing operations without requiring any information from a user.

However, management of the processing history may become complicated especially when a wide variety of image processing operations is performed in order to meet a wide variety of user applications. Further, it has been difficult to present the processing history in a way understandable to the user.

BRIEF SUMMARY OF THE INVENTION

One exemplary embodiment of the present invention includes an apparatus, method, system, computer program and product, each capable of inputting an input image; obtaining an image object indicating image processing to be applied to the input image; and managing a state of the image object and transition of the state.

Another exemplary embodiment of the present invention includes an apparatus, method, computer program and product, each capable of inputting an input image; obtaining an image object indicating image processing to be applied to the input image; managing a state of the image object and transition of the state; and outputting the state of the image object and the transition of the state as transition data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
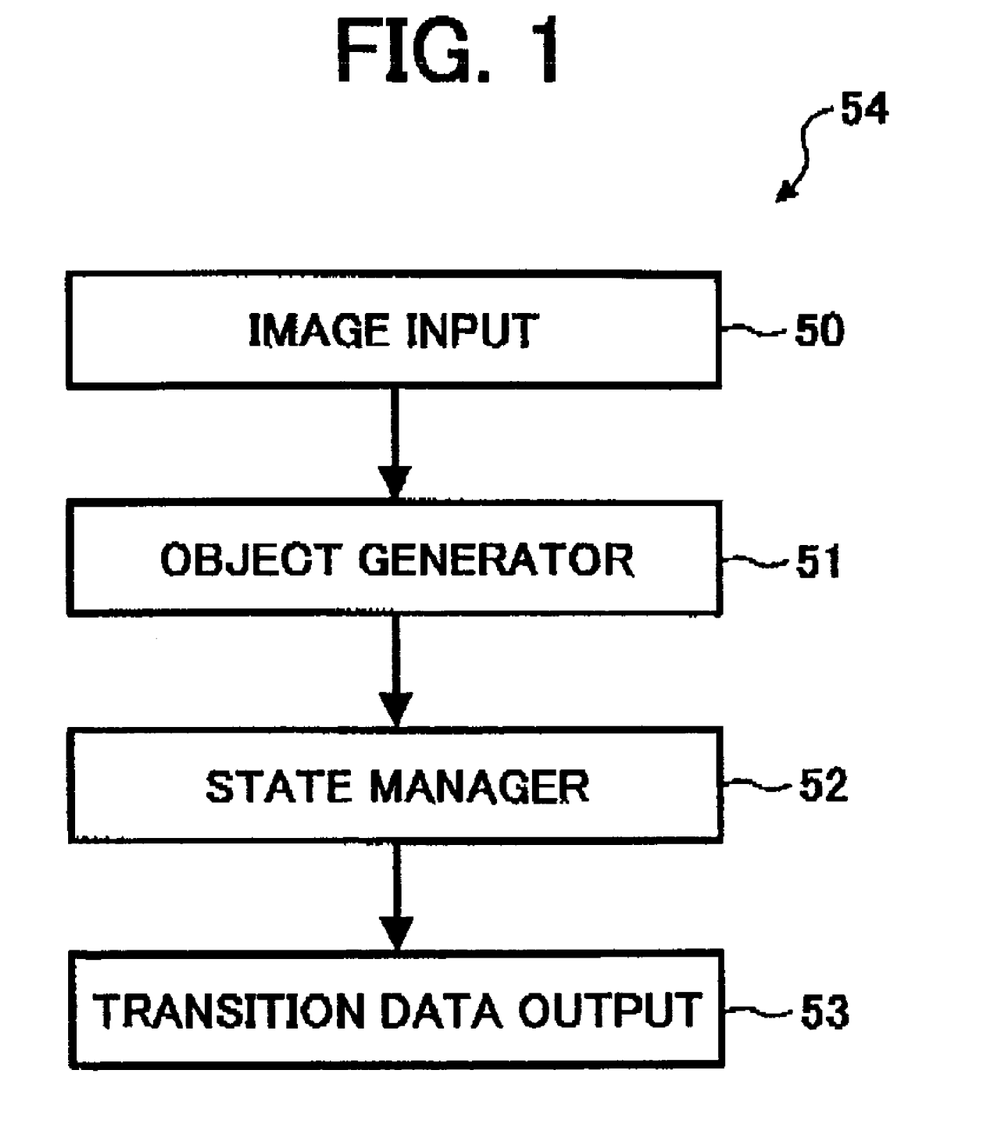
FIG. 1 is a schematic block diagram illustrating an image processing apparatus according to an exemplary embodiment of the present invention.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 54 according to an exemplary embodiment of the present invention.

The image processing apparatus 54 includes an image input 50, object generator 51, state manager 52, and transition data output 53.

The image input 50 inputs an image ("input image") according to an instruction from a user. In one example, the input image may be generated by scanning a printed image. Alternatively, the input image may be received from any other device or apparatus via a network or an interface. Alternatively, the input image may be read out from a storage device provided in the image processing apparatus 54. After receiving the input image, the image input 50 may normalize the input image using any one of the known image normalization methods.

The object generator 51 obtains an image object, which indicates a specific type of image processing to be applied to the input image to generate an output image suitable for a specific application. The object generator 51 may obtain one or more image objects from a plurality of image objects stored in the image processing apparatus 54. Alternatively, the object generator 51 may generate one or more image objects according to a specific user application. In this exemplary embodiment, the image object may be defined by its state and behavior.

The state manager 52 manages a state of an image object and transition of the state. The state of the image object changes, as the parameters of its attributes are changed by the behavior of the image object. In one example, the state manager 52 may obtain a current state of an image object, and transition of the current state indicating how the current state is derived from its start state. In another example, the state manager 52 may search a specific state of an image object from a plurality of states, which may exist between the start state and the current state. In another example, the state manager 52 may search a specific state of an image object, which may be derived from the current state, such as its future state. In this exemplary embodiment, transition may represent any kind of relationships between two closely-located states, including sequence, concurrency, synchronization, etc.

The transition data output 53 outputs the state of the image object and the transition of the state as transition data in a form understandable to a user. In one example, the transition data output 53 may output the current state of the image object and transition of the current state as transition data. In another example, the transition data output 53 may output a predictable state indicating any possible state other than the existing states, which may exist between the start state and the current state, as transition data. In another example, the transition data output 53 may output a future state, which may be derived from the current state, such as its goal state indicating the final state of the image object.

In an exemplary operation, the image processing apparatus 54 outputs transition data to help a user understand how the output image has been generated. Using the transition data, the user may edit image processing, which has been applied to the input image, to generate an output image more suitable to a user's preference.

In another exemplary operation, the image processing apparatus 54 outputs transition data to help a user predict an output image. Using the transition data, the user may select image processing capable of generating an output image suitable for the user.

Figure 2:
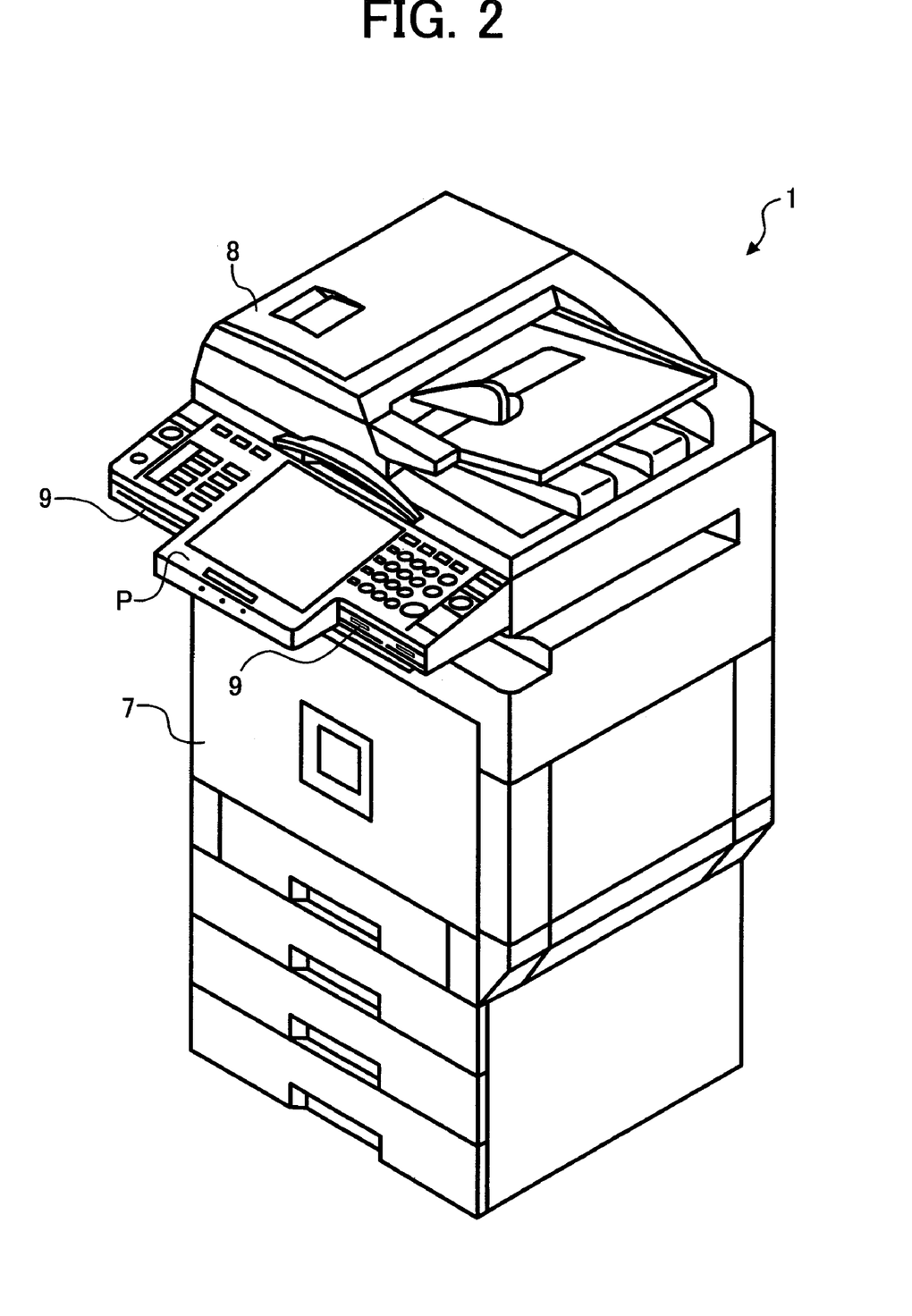
FIG. 2 is a perspective view illustrating a multifunctional apparatus operating as the image processing apparatus shown in FIG. 1 according to an exemplary embodiment of the present invention.

In this exemplary embodiment, the image processing apparatus 54 may be implemented by a multifunctional apparatus (MFP) 1 shown in FIG. 2. The MFP 1 may look like a copier having a reader 8 at the top surface, a printer 7 in its inside, and an operational panel P. The MFP 1 is further provided with a removable media controller 9, which reads or writes data from or onto a recording medium. With this configuration, the MFP 1 may perform a wide variety of image processing operations on the input image including scanning, copying, faxing, printing, storing, sending, editing, etc.

Figure 3:
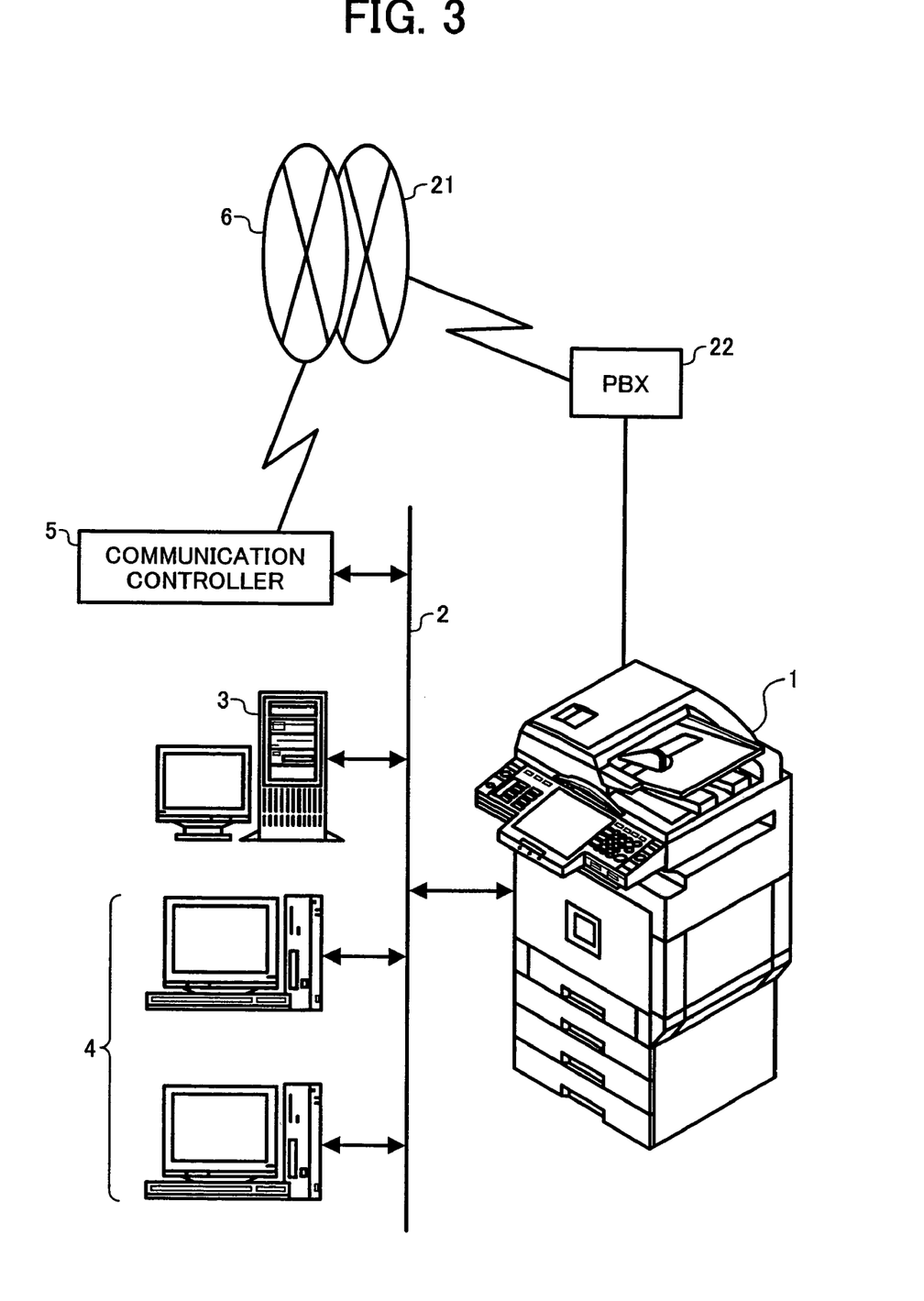
FIG. 3 is a view illustrating an image processing system according to an exemplary embodiment of the present invention.

The MFP 1 may be connected to a plurality of devices or apparatuses to create an image processing system as illustrated in FIG. 3. For example, referring to FIG. 3, the MFP 1 may be connected to a server computer 3 and a plurality of client computers 4 via a local area network (LAN) 2. In this exemplary embodiment, the server computer 3 may operate as a web server, mail server, or domain name server. Further, the MFP 1 may be connected to the Internet 6 via a communication controller 5, and to a public switched telephone network (PSTN) 21 via a public box exchange (PBX) 22. The image processing system of FIG. 3 allows a plurality of users to share at least one of the functions provided by the MFP 1.

In this exemplary embodiment, the LAN 2 may be implemented by any kind of network including a wireless network using radio frequency or infrared waves, or a wired network such as an optical fiber. Further, the communication controller 5 includes any kind of devices capable of connecting the LAN 2 to the Internet 6, such as a router, exchanging device, cable modem, DSL modem, etc. In this exemplary embodiment, the communication controller 5 may be incorporated in the MFP 1.

Figure 4:
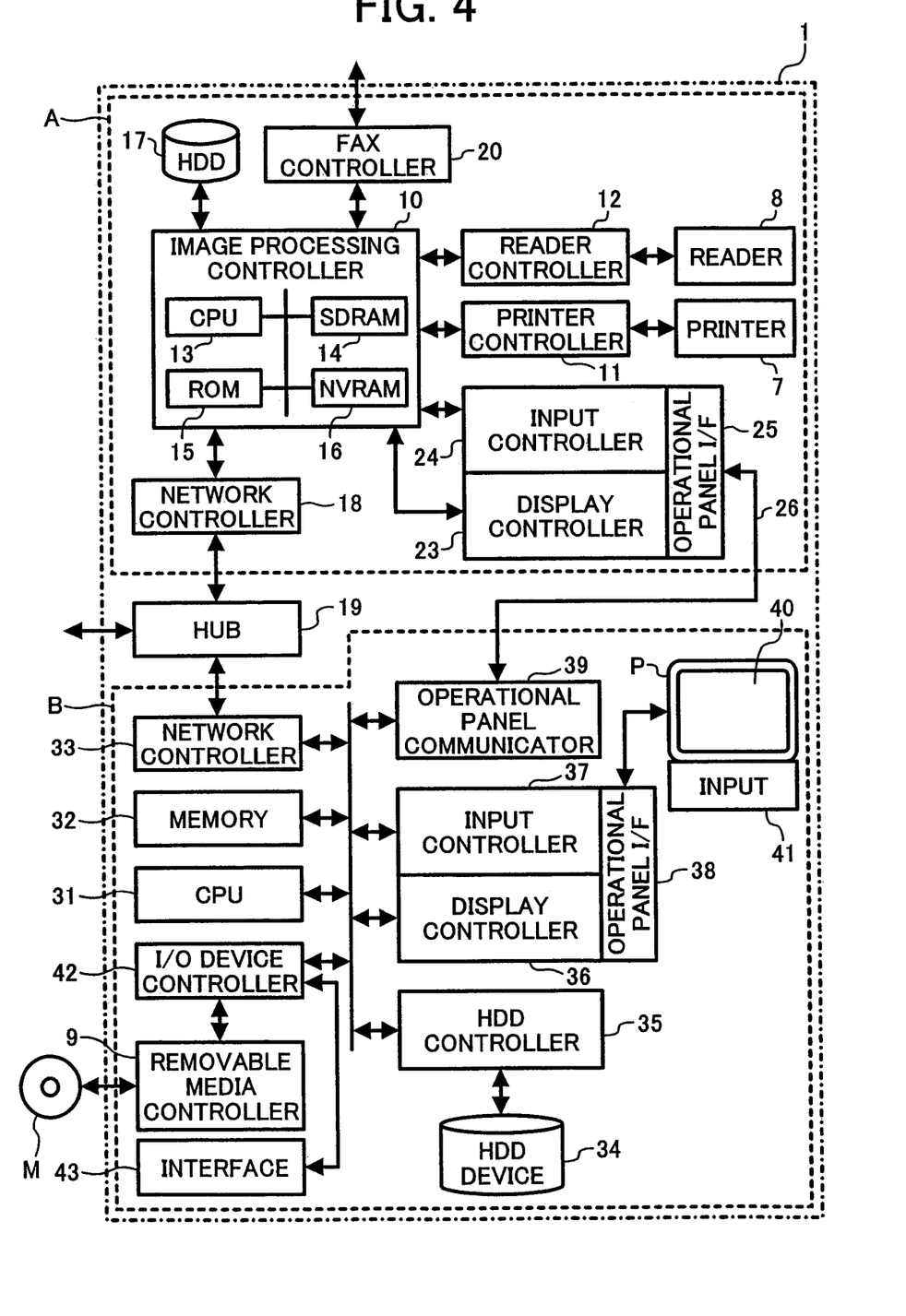
FIG. 4 is a schematic block diagram illustrating a structure of the multifunctional apparatus shown in FIG. 2 according to an exemplary embodiment of the present invention.

Referring to FIG. 4, the MFP 1 mainly includes an image processing unit A and an information processing unit B, which are connected to each other via a hub 19. However, the image processing unit A and the information processing unit B may be connected via any other communication device, such as a switch or a switching hub, for example.

The image processing unit A includes the reader 8, the printer 7, a reader controller 12, a printer controller 11, an image processing controller 10, a HDD (hard disk drive) 17, a fax controller 20, a network controller 18, an input controller 24, a display controller 23, and an operational panel I/F (interface) 25.

The information processing unit B includes a network controller 33, a memory 32, a CPU 31, an I/O (input/output) device controller 42, the removable media controller 9, an interface 43, an operational panel communicator 39, an input controller 37, a display controller 36, an operational panel I/F 38, the operational panel P having a display 40 and an input 41, a HDD controller 35, and a HDD 34.

The reader 8 includes any kind of device capable of reading an input image into image data, such as a scanner, for example.

The printer 7 includes any kind of device capable of forming an image on a recoding medium, such as an image forming device, for example. In this exemplary embodiment, the printer 7 can form a full color image, using any one of image forming methods including electrophotography, ink-jet, dye sublimation transfer, silver salt photography, thermal recording, thermal transfer, etc.

The reader controller 12 includes any kind of device capable of controlling an operation of the reader 8, according to an instruction received from the image processing controller 10. For example, upon receiving an instruction for reading from the image processing controller 10, the reader controller 12 causes the reader 8 to irradiate a light to a surface of an input image, and converts the reflected light to image data, such as 8-bit RGB data if the input image is in color.

The printer controller 11 includes any kind of device capable of controlling an operation of the printer 7, according to an instruction received from the image processing controller 10. For example, upon receiving an instruction for printing from the image processing controller 10, the printer controller 11 causes the printer 7 to form a toner image on a recording medium.

The image processing controller 10 includes any kind of device capable of controlling image processing performed by the image processing unit A, such as a microcomputer. The image processing controller 10 includes a central processing unit (CPU) 13, a synchronous dynamic random access memory (SDRAM) 14, a read only memory (ROM) 15, and a non-volatile random access memory (NVRAM) 16, which are connected to one another via a bus. The CPU 13 operates as a main processor. The SDRAM 14 stores image data, including image data read by the reader 8, image data to be printed by the printer 7, etc. The ROM 15 stores various programs such as a control program to be operated by the CPU 13 for controlling an operation of the image processing unit A. The NVRAM 16 stores various data, such as job history data or preference data, for example The HDD 17, which is connected to the image processing controller 10, includes any kind of storage device capable of storing a large amount of data, including image data, job history data, and program data, for example The fax controller 20, which is connected to the image processing controller 10, includes any kind of communication device capable of allowing the image processing unit A to communicate with other devices via a communication network. For example, the fax controller 20 connects the image processing unit A to the PSTN 21 via the PBX 22 as illustrated in FIG. 3. With this configuration, the image processing unit A can receive or send fax data.

The network controller 18, which is connected to the image processing controller 10, includes any kind of communication device capable of allowing the image processing unit A to communicate with other devices via a computer network, such as the LAN 2 or the Internet 6, through the hub 19.

The input controller 24 generates a display control signal according to an instruction from the image processing controller 10, and sends it to the information processing unit B through the operational panel I/F 25 and a communication cable 26. The display control signal, received by the operational panel communicator 39, is further transmitted to the operational panel P through the display controller 36 and the operational panel I/F 38. The operational panel P displays data according to the display control signal.

The display controller 23 receives an input control signal from the information processing unit B through the communication cable 26 and the operational 5 panel I/F 25.

The CPU 31 includes any kind of processor capable of controlling an operation of the information processing unit B. The memory 32 includes any kind of memory unit, such as a RAM functioning as a work memory for the CPU 31, and a ROM storing various data.

The HDD 34 stores various data, including image data, job history data, preference data, etc. Further, the HDD 34 may store various programs, such as an OS (operating system) program, an email controlling program, and an image processing program of the present invention, for example. The HDD controller 35 controls data input or data output of the HDD 34.

The network controller 33 includes any kind of communication device capable of allowing the information processing unit B to communicate with other devices via a computer network, such as the LAN 2 or the Internet 6, through the hub 19. The network controller 33 is preferably assigned with an IP address different from that of the network controller 18.

The input controller 37 generates an input control signal according to an instruction input by a user through the operational panel P, and sends it to the image processing unit A through the operational panel communicator 39 and the communication cable 26.

The display controller 36 receives a display control signal from the image processing unit A through the communication cable 26 and the operational panel communicator 39.

As described above, the operational panel communicator 39 exchanges data between the image processing unit A and the information processing unit B. To make this exchange possible, the operational panel communicator 39 may perform data conversions, if the image processing unit A and the information processing unit B operate in different formats.

The I/O device controller 42 includes any kind of device capable of controlling an operation of an input or output device connected through the interface 43, such as a digital camera, for example.

The interface 43 includes any kind of interface, such as USB, IEEE1394, or SCSI.

The removable media controller 9 includes any kind of device capable of controlling an operation of a recording medium M, such as an optical disc driver, for example.

The recording medium M includes any kind of recording medium capable of storing various data and programs. Examples include, but are not limited to, optical discs such as CD-ROM, CD-R, CD-RW, DVD-ROM, DVD-RAM, DVD-R, DVD+R, DVD-RW, and DVD+RW, magneto optical discs, memory cards, and flexible disks.

Figure 5:
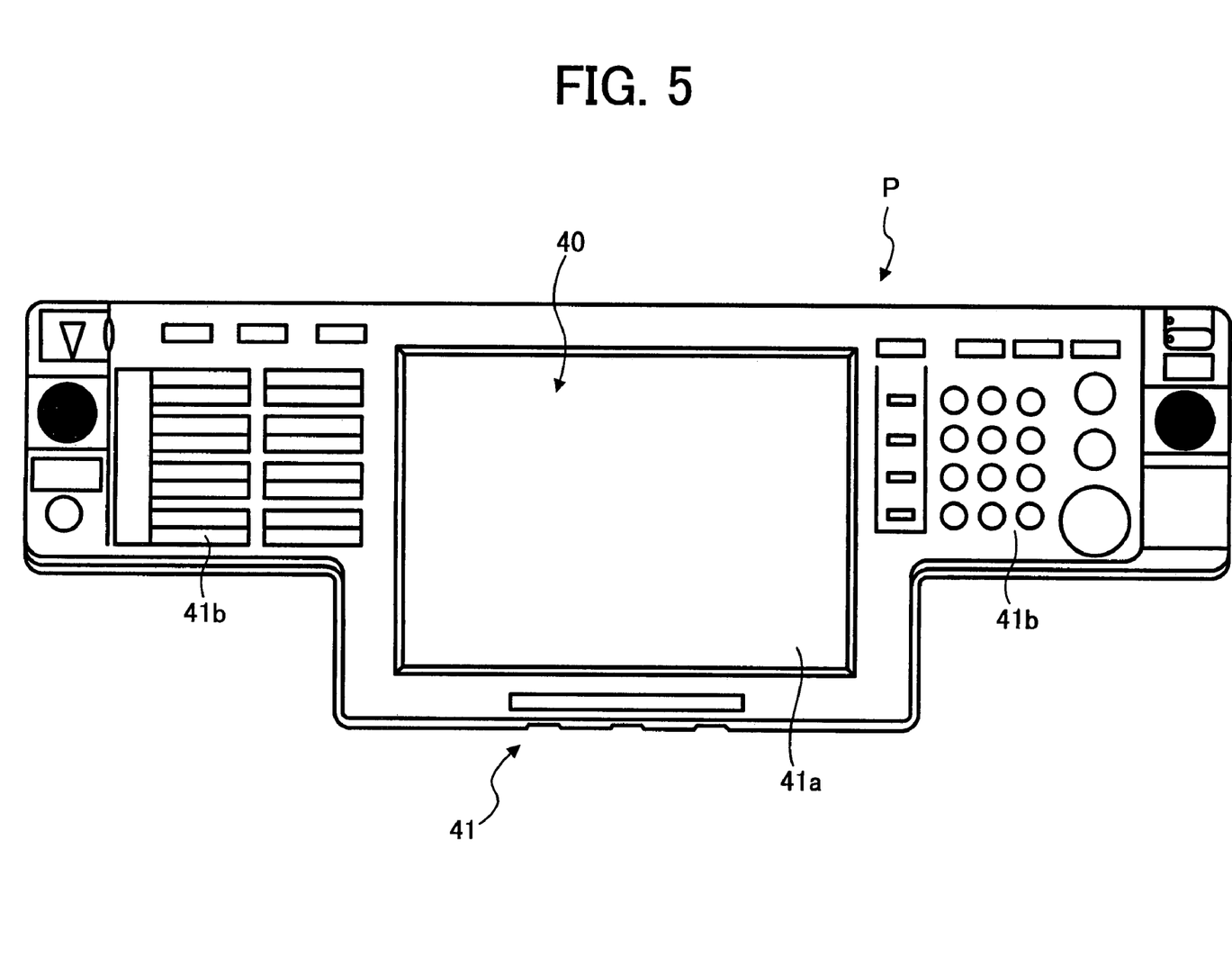
FIG. 5 is an illustration of an operational panel of the multifunctional apparatus shown in FIG. 2 according to an exemplary embodiment of the present invention.

As shown in FIG. 5, the operational panel P includes the display 40 and the input 41. The display 40 includes any kind of device capable of displaying various information including an instruction received from the image processing unit A, such as an LCD (liquid crystal display), for example.

The input 41 includes any kind of device capable of inputting an instruction from a user, such as a keyboard, for example. In this exemplary embodiment, the input 41 includes a touch panel 41*a* placed on the surface of the display 40, and a number of keys or buttons 41*b*.

In alternative to the structure shown in FIG. 2, the image processing apparatus 54 of FIG. 1 may be implemented by a general-purpose computer including a processor and a storage device. To provide the functions substantially equal to the functions of the MFP 1, the computer may be preferably provided with one or more peripheral devices or apparatuses, including a scanner, printer, facsimile, etc.

As described above referring to FIG. 4, the HDD 34 of the information processing unit B stores the image processing program of the present invention. Upon receiving an instruction, the image processing program causes the MFP 1 to operate as the image processing apparatus 54 of FIG. 1.

In an exemplary operation, the MFP 1 reads an input image using the reader controller 12 and the reader 8 into a raster image. From the raster image, the MFP 1 may obtain various kinds of information including its size, color depth, resolution, etc. At this time, the MFP 1 may normalize the input image using a normalization program, which may be stored in the HDD 34.

Figure 6:
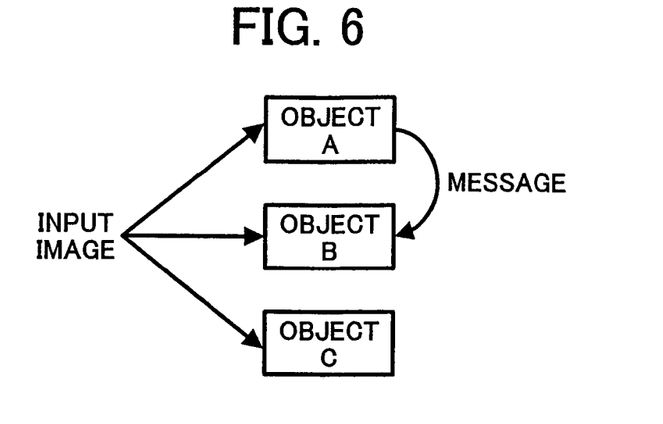
FIG. 6 is an illustration of an image object according to an exemplary embodiment of the present invention.

The MFP 1 generates one or more image objects, each indicating a specific type of image processing to be applied to the input image. Alternatively, the MFP 1 may use one or more image objects stored in the HDD 34. In this exemplary embodiment, the image object is an instance of a class "image", as illustrated in FIG. 6, which can interact or communicate with another image object by sending a message.

Figure 7:
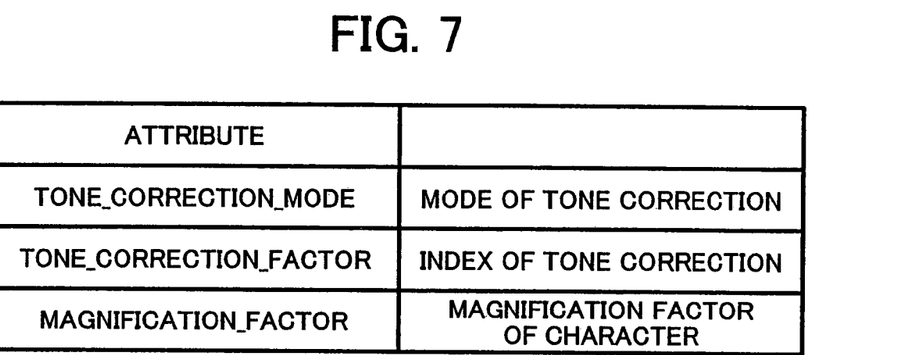
FIG. 7 is a table listing exemplary attributes of an image object according to an exemplary embodiment of the present invention.
Figure 8:
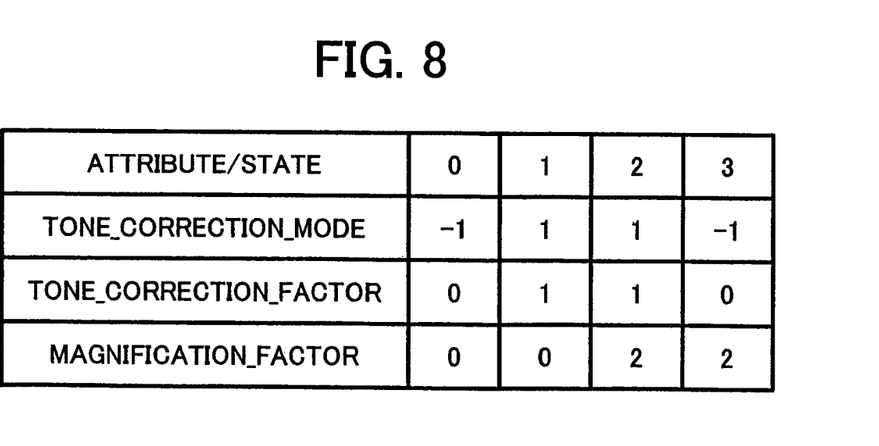
FIG. 8 is a table listing exemplary parameters of the attributes shown in FIG. 7 in a corresponding manner with states of an image object, according to an exemplary embodiment of the present invention.
Figures 9, 10:
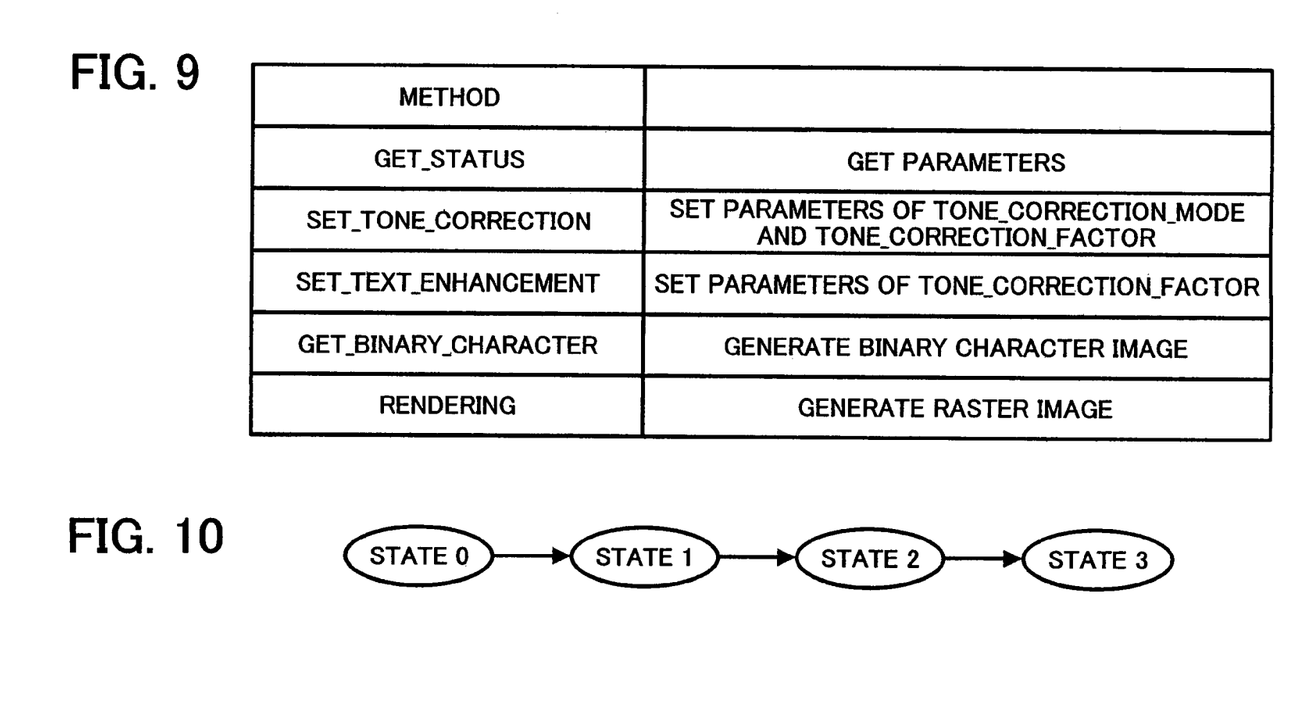
FIG. 9 is a table listing exemplary methods of an image object according to an exemplary embodiment of the present invention.
FIG. 10 is an illustration of transition data according to an exemplary embodiment of the present invention.

Referring now to FIGS. 7 to 9, an operation of generating an image object is explained according to an exemplary embodiment of the present invention.

As described above, an image object may be defined by its state. The state may be characterized by the attributes of the image object and the parameters of each of the attributes. For example, the image object may have a state, which can be characterized by the attributes shown in FIG. 7.

Referring to FIG. 7, the attribute "tone_correction_mode" indicates a mode of tone correction, having a first parameter for performing background color elimination ("0"), a second parameter for performing background color noise removing ("1"), a third parameter for performing no tone correction ("−1"), etc. The attribute "tone_correction_factor" indicates an index of tone correction, having a first parameter for setting none of the levels ("0"), a second parameter for setting the level of tone correction to 1 ("1"), etc. The attribute "magnification_factor" indicates a magnification factor of a character, having a first parameter for performing no magnification ("0"), a second parameter for setting the magnification factor of the character to 2 ("2"), etc.

Referring to FIG. 8, a first state "0" may be defined by the attribute "tone_correction_mode" having the parameter "−1", the attribute "tone_correction_factor" having the parameter "0", and the attribute "magnification_factor" having the parameter "0". A second state "1" may be defined by the attribute "tone_correction_mode" having the parameter "1", the attribute "tone_correction_factor" having the parameter "1", and the attribute "magnification_factor" having the parameter "0". A third state "2" may be defined by the attribute "tone_correction_mode" having the parameter "1", the attribute "tone_correction_factor" having the parameter "1", and the attribute "magnification_factor" having the parameter 2. A fourth state "3" may be defined by the attribute "tone_correction_mode" having the parameter "−1", the attribute "tone_correction_factor" having the parameter "0", and the attribute "magnification_factor" having the parameter 2.

As described above, an image object may be also defined by its behavior. The behavior may be characterized by the methods, i.e., the set of operations performed upon the image object. For example, as illustrated in FIG. 9, the methods of the image object include a method "get_status" for getting the parameters of the attributes, a method "set_tone_correction" for setting the parameters of the attribute "tone_correction_mode" or the attribute "tone_correction_factor", a method "set_text_enhancement" for setting the parameters of the attribute "tone_correction_factor", a method "get_binary_character" for generating a binary character image, and a method "rendering" for generating a raster image by referring to the current state of the image object.

The state of the image object corresponds to the cumulative results obtained by performing one of the above-described and other methods on the image object. For example, referring to FIG. 8, the second state "1" can be obtained by performing the following methods having the parameters shown in the parenthesis:

set_tone_correction(1, 1);
set_text_enhancement(0); and
rendering( ).

Similarly, the third state "2" can be obtained by performing the following methods having the parameters:

set_tone_correction(1, 1);
set_text_enhancement(2); and
rendering ( ).

Similarly, the fourth state "3" can be obtained by performing the following methods having the parameters:

set_tone_correction(−1, 0);
set_text_enhancement(2); and
rendering ( ).

In addition to generating an image object, the MFP 1 may manage a state of the image object and transition of the state. In this exemplary embodiment, the MFP 1 performs the method "get_status" to get the parameters of the attributes indicating the current state of the image object. By using the method "get_status", the MFP 1 can obtain the parameters of the attributes for each of the states from a start state to a current state, which may be used to indicate transition of the current state indicating, for example, how the current state is moved from the start state.

Further, upon receiving a request from a user, the MFP 1 may display the state of the image object and transition of the state as transition data with a graph structure as illustrated in FIG. 10, for example. In FIG. 10, each circle corresponds to each state, while each arrow corresponds to the transition of each state. The transition data may be displayed on the display 40 of the operational panel P. Alternatively, the MFP 1 may send the transition data to one of the client computers 4 to cause the computer 4 to display the transition data.

Furthermore, the MFP 1 may search for a state of the image object having a specific set of parameters of the attributes. For example, the MFP 1 may receive a request for searching a state having a specific set of parameters from a user. At this time, the user may input the set of parameters using the input 41 of the operational panel P, or a keyboard provided with the client computer 4. Upon receiving the request, the MFP 1 searches for the state having the specified set of parameters, and displays the search result on the display 40 of the operational panel P or the display of the client computer 4.

Figure 11:
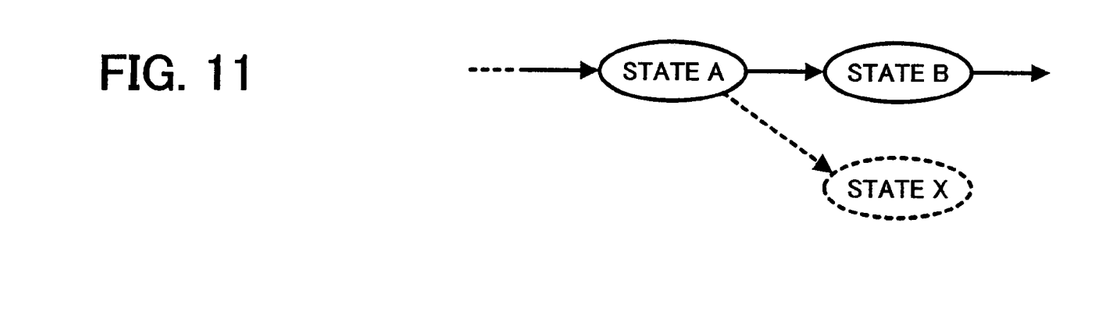
FIG. 11 is an illustration of transition data according to an exemplary embodiment of the present invention.

Furthermore, the MFP 1 may search for a predictable state of the image object, which may be derived from the start state of the image object. For example, the MFP 1 may receive a request for searching a predictable state from a user. Upon receiving the request, the MFP 1 generate a predictable state by changing the parameters of the attributes, and displays transition data indicating the generated predictable state on the display 40 of the operational panel P or the display of the client computer 4, as illustrated in FIG. 11. In FIG. 11, the predictable state X is displayed as a future state of the current state A.

Figure 12:
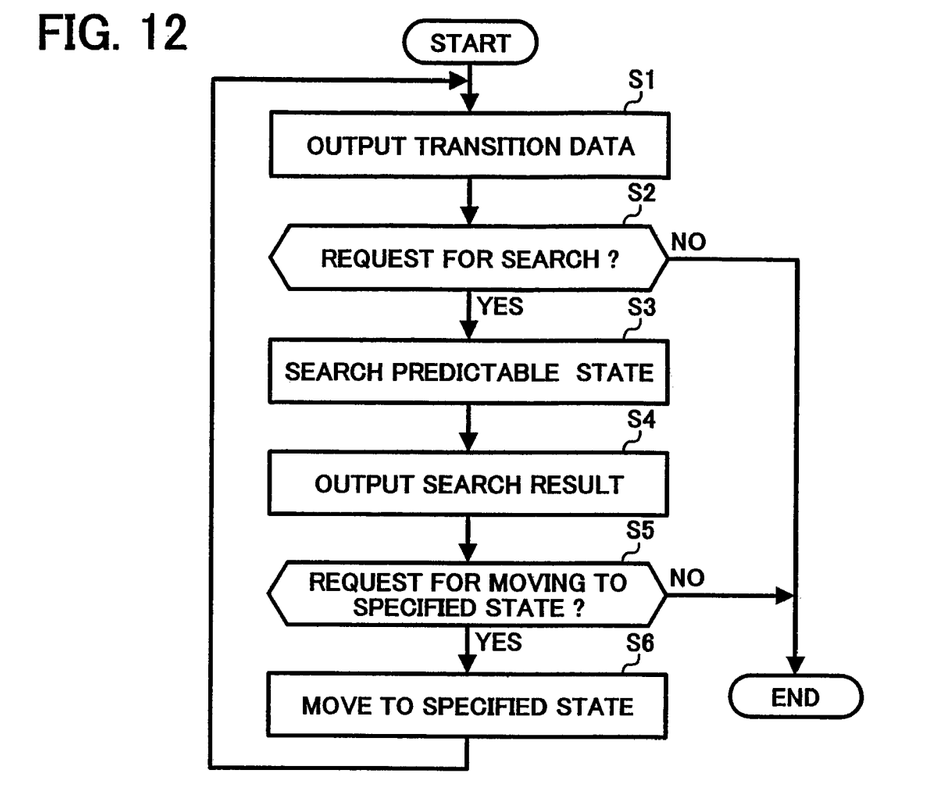
FIG. 12 is a flowchart illustrating an operation of outputting transition data according to an exemplary embodiment of the present invention.

Referring now to FIG. 12, an operation of outputting transition data is explained according to an exemplary embodiment of the present invention. The steps illustrated in FIG. 12 are performed by the MFP 1 when a request for displaying a current state of an image object is received through the operational panel 40.

Step S1 displays the current state of the image object as transition data. In this exemplary embodiment, the MFP 1 may display, in addition to the current state, transition of the current state indicating how the current state is moved from its start state. In addition to the current state and the transition of the current state, the MFP 1 may display a goal state indicating the final state of the image object, which is previously determined according to a user application. The transition data is displayed with a graph structure as illustrated in any one of FIGS. 15 to 20. In any one of FIGS. 15 to 20, the circle corresponds to a state, while the arrow corresponds to transition of the state.

Figure 15:
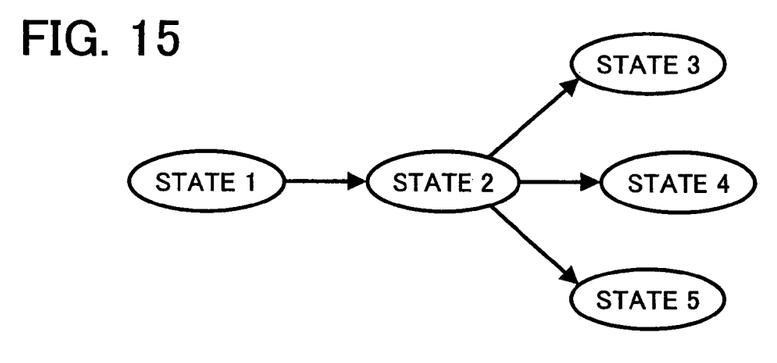
FIG. 15 is an illustration of transition data according to an exemplary embodiment of the present invention.
Figure 16:
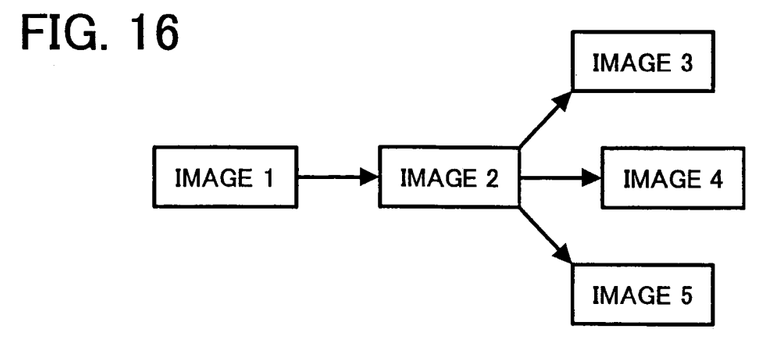
FIG. 16 is an illustration of transition data according to an exemplary embodiment of the present invention.

Further, in this exemplary embodiment, the MFP 1 may display each state as a node as illustrated in FIG. 15 or as an image as illustrated in FIG. 16. The image of FIG. 16 may correspond to a thumbnail image of an image, which has been generated by applying specific image processing to the input image. In this exemplary embodiment, the thumbnail image is a raster image, such as a bitmap image.

Figure 17:
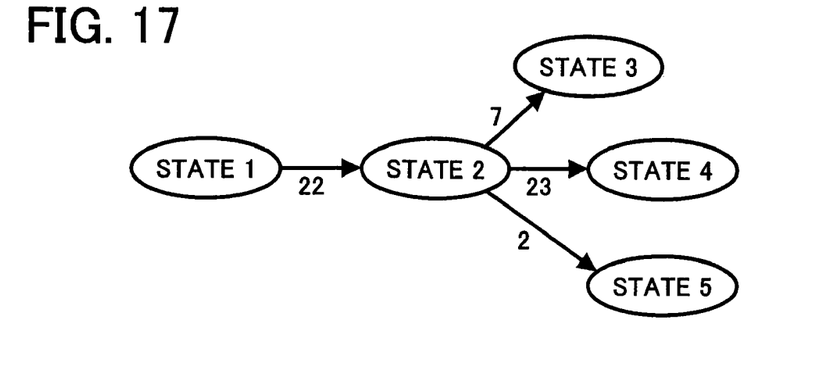
FIG. 17 is an illustration of transition data according to an exemplary embodiment of the present invention.
Figure 18:
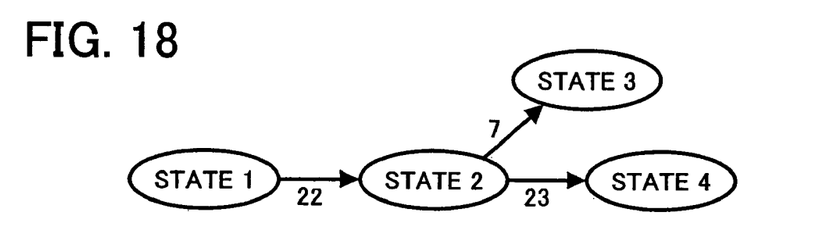
FIG. 18 is an illustration of transition data according to an exemplary embodiment of the present invention.

Alternatively, the MFP 1 may additionally display information indicating the total number of transitions ("transition number") occurred from the start state to the current state as illustrated in FIG. 17 or 18. In FIG. 17, the transition number is displayed for each of the states. In FIG. 18, the transition number is displayed for a selected number of the states, such as the state having a large value of the transition number, such as the state 2, for example.

Figure 19:
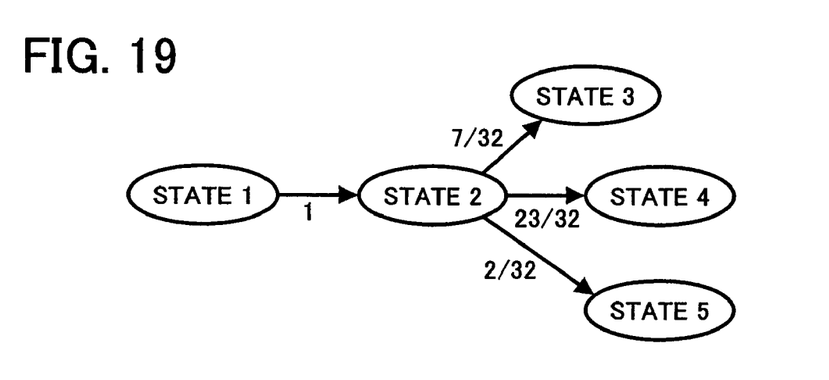
FIG. 19 is an illustration of transition data according to an exemplary embodiment of the present invention.
Figure 20:
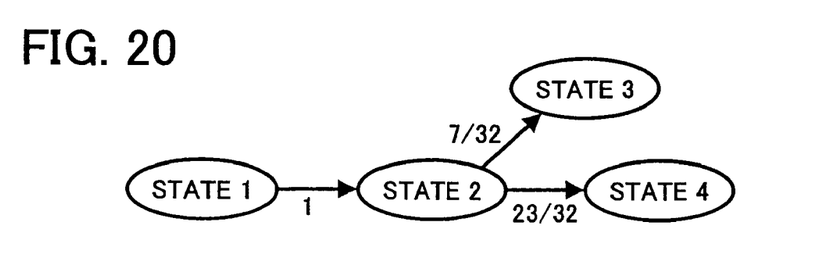
FIG. 20 is an illustration of transition data according to an exemplary embodiment of the present invention.

Alternatively, the MFP 1 may additionally display the probability of which a target state moves to a next state ("transition probability") as illustrated in FIG. 19 or 20. For example, the probability of which the state 2 moves to the state 3 is 7 transitions out of 32 transitions. In FIG. 19, the transition probability is displayed for each of the states. In FIG. 20, the transition probability is displayed for a selected number of the state, such as the state having a value of the large transition probability.

Step S2 determines whether a request for searching a predictable state is received through the operational panel P. If the request is received ("YES" in Step S2), the operation proceeds to Step S3. Otherwise ("NO" in Step S2), the operation ends.

Step S3 searches a predictable state. In this exemplary embodiment, the predictable state corresponds to a part of or all possible states of the image object, which may be derived from the start state of the current state.

Figure 13:
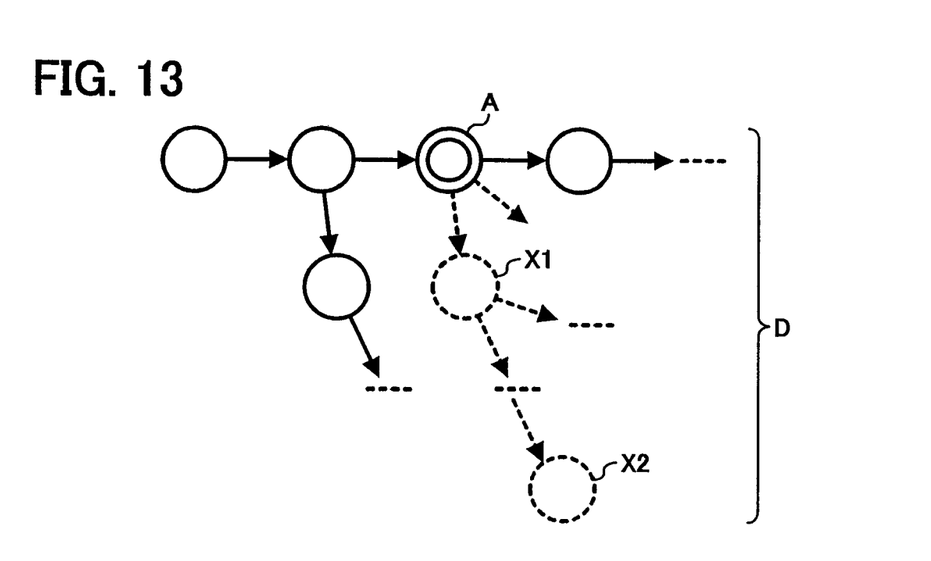
FIG. 13 is an illustration of transition data according to an exemplary embodiment of the present invention.

In one example, as illustrated in FIG. 13, the predictable state XI or X2 may be determined based on the number of transitions occurred from the current state A. The number of transitions may be set default or determined according to user's preference. For example, the user may set the number of transitions (represented by D in FIG. 13) to be 2, 5, or 7, depending on how deeply the search is performed.

Figure 14:
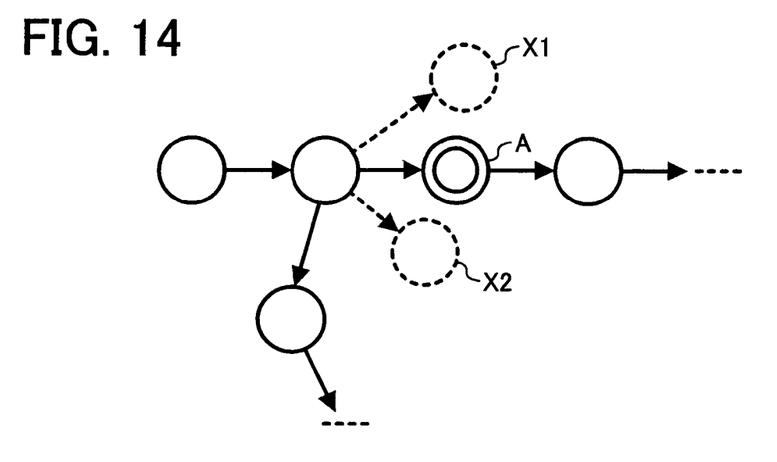
FIG. 14 is an illustration of transition data according to an exemplary embodiment of the present invention.

In another example, as illustrated in FIG. 14, the predictable state XI or X2 may be determined based on the state from which the current state A is derived using the concurrency relationship.

Step S4 outputs transition data indicating the predictable state as illustrated in FIG. 13 or 14.

Step S5 determines whether a request for moving to a predictable state is received through the operational panel P. In this step, if more than one predictable state is output in Step S4, the user may specify one of the predictable states. If the request is received ("YES" in Step S5), the operation proceeds to Step S6 to move to the specified predictable state. Otherwise ("NO" in Step S5), the operation ends.

Any one of the above-described and other functions of the image processing apparatus 54 of FIG. 1 may be embodied in the form of a computer program stored in any kind of storage medium. Alternatively, any one of the above-described and other functions of the image processing apparatus 54 of FIG. 1 may be implemented by ASIC, prepared by interconnecting an appropriate network of conventional component circuits or by a combination thereof with one or more conventional general purpose microprocessors and/or signal processors programmed accordingly.

Numerous additional modifications and variations are possible in light of the above teachings. It is therefore to be understood that within the scope of the appended claims, the disclosure of this patent specification may be practiced by methods and apparatuses other than those specifically described herein.

For example, elements and/or features of different illustrative embodiments may be combined with each other and/or substituted for each other within the scope of this disclosure and appended claims.

Further, an image object may be generated in various ways other than those described above, as long as it is generated using the concept of object-oriented programming. Similarly, a state of the image object may be managed in various ways other than those described above, as long as the state or transition of the state can be defined based on the concept of object-oriented programming. For example, any kind of state including a start state, current state, predictable state, future state, or goal state, may be applied based on the concept of state space.

Furthermore, a method of searching a state may be performed in various ways other than those described above, depending on the search result desired by a user. For example, if a higher searching speed is desired, the number of states for a search may be reduced. In another example, if a higher reliability in a search is desired, the number of states for search may be increased. In yet another example, if a higher operability in a search is desired, a searching operation may be performed automatically without any intervention from the user.

This patent application is based on and claims priority to Japanese patent application No. 2004-254046 filed on Sep. 1, 2004, in the Japanese Patent Office, the entire contents of which are hereby incorporated by reference.

What is claimed as new and desired to be protected by Letters Patent of the United States is:

1. An image processing apparatus, comprising:
   means for inputting an input image;
   means for obtaining an image object indicating specific image processing to be applied to the input image;
   means for managing a state of the image object and transition of the state; and
   means for outputting the state of the image object and the transition of the state as transition data,
   wherein the means for managing comprises means for obtaining a transition probability, which is included in the transition data.

2. The apparatus of claim 1, wherein the managing means comprises: means for obtaining a transition number, wherein the transition data includes the transition number.

3. The apparatus of claim 1, wherein the transition data has a graph structure.

4. The apparatus of claim 1, wherein the managing means comprises: means for searching a specific state of the image object.

5. The apparatus of claim 4, wherein the searching means is controlled by an instruction from a user.

6. The apparatus of claim 4, wherein the transition data includes the specific state of the image object.

7. The apparatus of claim 6, further comprising:
   means for generating an output image by applying image processing defined by the image object having the specific state to the input image.

8. The apparatus of claim 7, further comprising: means for outputting the output image.

9. An image processing system, comprising:
   a processor; and
   a storage device configured to store a plurality of instructions which, when activated by the processor, cause the processor to perform an image processing operation comprising the steps of:
   inputting an input image;
   obtaining an image object indicating image processing to be applied to the input image; and
   managing a state of the image object and transition of the state, including obtaining a transition probability.

10. The system of claim 9, wherein the image processing operation further comprises the step of:
   outputting the state of the image object and the transition of the state as transition data, which includes the transition probability.

11. A computer readable medium storing computer instructions for performing an image processing operation, which when executed by a computer causes the computer to perform the steps of:
   inputting an input image;
   obtaining an image object indicating image processing to be applied to the input image; and
   managing a state of the image object and transition of the state, including obtaining a transition probability.

12. The medium of claim 11, wherein the image processing operation further comprises the step of:

outputting the state of the image object and the transition of the state as transition data, which includes the transition probability.

13. A method for managing image processing, the method being carried out on a computing apparatus, the method comprising the steps of:

obtaining an image object using an object generator, the image object indicating image processing to be applied to an input image;

managing a state of the image object and transition of the state, including obtaining a transition probability, using a state manager; and outputting the state of the image object and the transition of the state as transition data, which includes the transition probability, using a transition data output.

14. The method of claim 13, further comprising the steps of:

searching a specific state of the image object with the transition data using the state manager; and outputting the specific state using the transition data output.

15. The method of claim 14, wherein the specific state includes a plurality of states.

16. The method of claim 15, further comprising the steps of:

selecting one of the plurality of states searched as the specific state; and applying image processing defined by the image object having the selected state to the input image to generate an output image.

17. The method of claim 16, further comprising the step of: outputting the output image.

\* \* \* \* \*

UNITED STATES PATENT AND TRADEMARK OFFICE
CERTIFICATE OF CORRECTION

PATENT NO. : 7,619,755 B2  Page 1 of 1
APPLICATION NO. : 11/210839
DATED : November 17, 2009
INVENTOR(S) : Morimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Twenty-sixth Day of October, 2010

David J. Kappos
*Director of the United States Patent and Trademark Office*